H. SANGSTER.
Securing Glass in Lanterns.

No. 11,570.

Patented Aug. 22, 1854.

Witnesses

Inventor
Hugh Sangster

UNITED STATES PATENT OFFICE.

HUGH SANGSTER, OF BUFFALO, NEW YORK.

SECURING GLASSES IN LANTERNS.

Specification of Letters Patent No. 11,570, dated August 22, 1854.

*To all whom it may concern:*

Be it known that I, HUGH SANGSTER, of Buffalo, in the county of Erie and State of New York, have invented an Improved Mode of Securing the Glass Sides of Signal and other Lanterns in Their Places, which improvement is set forth and described in the following specification, in connection with the illustrations contained in the accompanying drawings, with sufficient clearness and minutia to enable others of competent skill to make and use my invention, which consists in the combination of a folding frame and springs, by the combined operation of which the glass is allowed to be introduced with the utmost facility, is pressed home to its seat, and held in that position by an equable pressure with sufficient firmness to keep it tight beyond any ordinary liability to the contrary.

Figure 1:
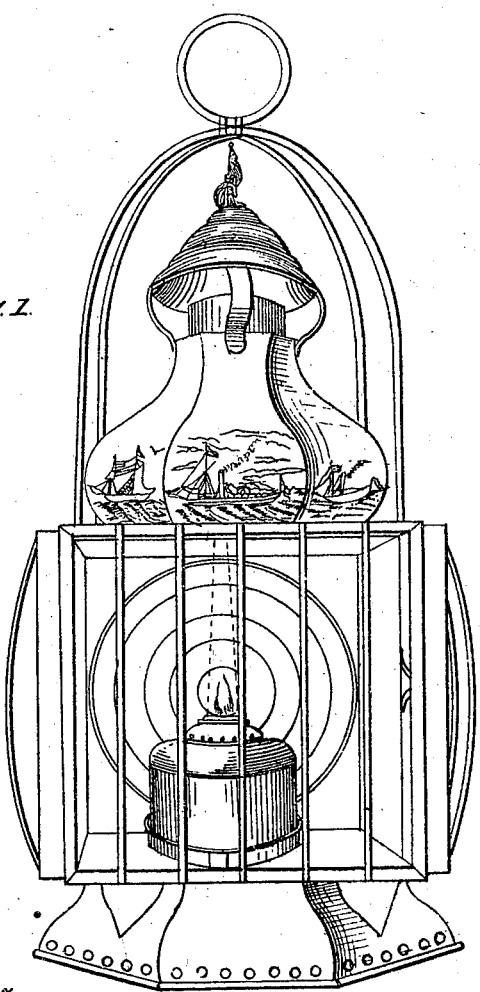
Figure 2:
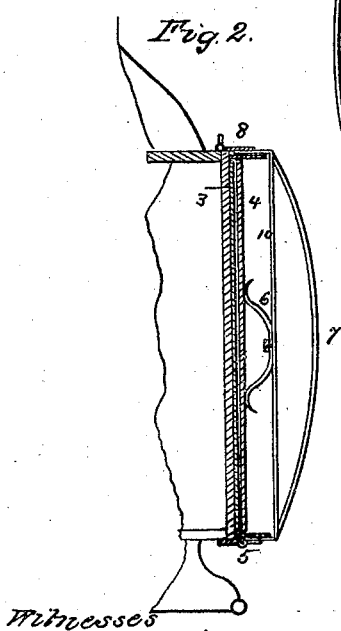
Figure 3:
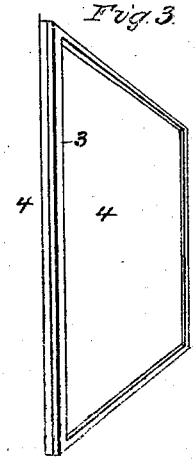

In the accompanying drawings, Figure 1 is a perspective view of a signal lantern in which my improvement is embodied, the view being taken in front of the lantern. Fig. 2 represents a vertical section of a portion of the front part of the lantern as made by a plane passing through the center from front to back, showing the construction and arrangement of the frame and springs. Fig. 3 is intended to represent in perspective (viewed from the left hand side of the page) one of the glass sides with putty spread upon the edges preparatory to its being introduced into its place.

4 represents the glass forming one of the sides of the lantern. It is bedded upon a layer of putty 3, to make it fit perfectly tight upon the flanch 9, and is pressed to its place and held there by the combined operation of the frame 10 and the springs 6 which springs are attached to the frame 10. This frame is fastened at the bottom and also at the top by hinges 5 and 8, the wire however which forms the axis of the upper hinge is made and put in in such a manner that it may be easily withdrawn so as to leave the frame free to turn on the lower hinge.

7 are the guards to protect the glass. The putty is first spread upon the edges of the glass as shown in Fig. 3, and the frame 10 being turned down, the glass is introduced into its place, and the frame being then brought up and fastened, the pressure of the springs upon the glass forces out the surplus putty and causes the glass to fit nicely at all points, and the constant pressure of the springs always keeps the glass in its place.

I claim to be the original and first inventor of, and ask Letters Patent for—

The combination of the springs 6 and the frame 10, arranged and operating substantially as herein set forth; not intending to claim the springs uncombined with the frame or some device equivalent thereto.

HUGH SANGSTER.

Witnesses:
 THOS. P. HOW,
 FRANCIS McGLOIN.